J. H. ADAMS.
OIL CONVERTING APPARATUS.
APPLICATION FILED DEC. 1, 1909.

1,320,354.

Patented Oct. 28, 1919.
7 SHEETS—SHEET 1.

WITNESSES:

INVENTOR

BY

ATTORNEYS.

J. H. ADAMS.
OIL CONVERTING APPARATUS.
APPLICATION FILED DEC. 1, 1909.

1,320,354. Patented Oct. 28, 1919.
7 SHEETS—SHEET 3.

WITNESSES:

INVENTOR
J. H. Adams
BY
ATTORNEYS.

J. H. ADAMS.
OIL CONVERTING APPARATUS.
APPLICATION FILED DEC. 1, 1909.

1,320,354.

Patented Oct. 28, 1919.
7 SHEETS—SHEET 5.

WITNESSES:

INVENTOR
J. H. Adams
BY
ATTORNEYS.

UNITED STATES PATENT OFFICE.

JOSEPH H. ADAMS, OF BROOKLYN, NEW YORK, ASSIGNOR TO THE TEXAS COMPANY, OF HOUSTON, TEXAS, A CORPORATION OF TEXAS.

OIL-CONVERTING APPARATUS.

1,320,854.        Specification of Letters Patent.        Patented Oct. 28, 1919.

Application filed December 1, 1909. Serial No. 530,852.

*To all whom it may concern:*

Be it known that I, JOSEPH H. ADAMS, a citizen of the United States, residing at Brooklyn, in the county of Kings and State of New York, have invented certain new and useful Improvements in Oil - Converting Apparatus, of which the following is a full, clear, and exact description, such as will enable others skilled in the art to which it appertains to make and use the same.

This invention relates to apparatus having the capacity of serving as a means instrumental in carrying out the oil-converting process disclosed and claimed in my Patent No. 976,975 granted Nov. 29, 1910.

This invention has in objective an apparatus capable of being built at a moderate cost, and so constructed and designed as to enable skilled workmen to readily operate the same at a high rate of commercial efficiency in raising the "gravity" (Baumé), *i. e.*, reducing the specific gravity of various grades of hydro-carbon oils, especially those of a semi-refined character.

A further object within the contemplation of this invention, is to provide an apparatus capable of some little variation in the mode of operation so as to particularly adapt the same to the treatment of different oils.

Another object is to secure simple and inexpensive parts and features and to so arrange and correlate the same as to render available a complete organization or system capable of continuously converting hydro-carbon oils on a commercial basis.

Other objects will be in part obvious from the annexed drawings and in part pointed out hereinafter.

The invention accordingly consists in the features of construction, combinations of elements and arrangement of parts which will be exemplified in the construction hereinafter set forth, and the scope of the application of which will be indicated in the following claims.

In order that this invention may be the more fully disclosed and otherwise made wholly comprehensible to those skilled in this art, drawings typical of the many possible embodiments thereof have been appended as a part of this disclosure, and in such drawings like characters of reference denote corresponding parts throughout the several views of which.

Figure 2:
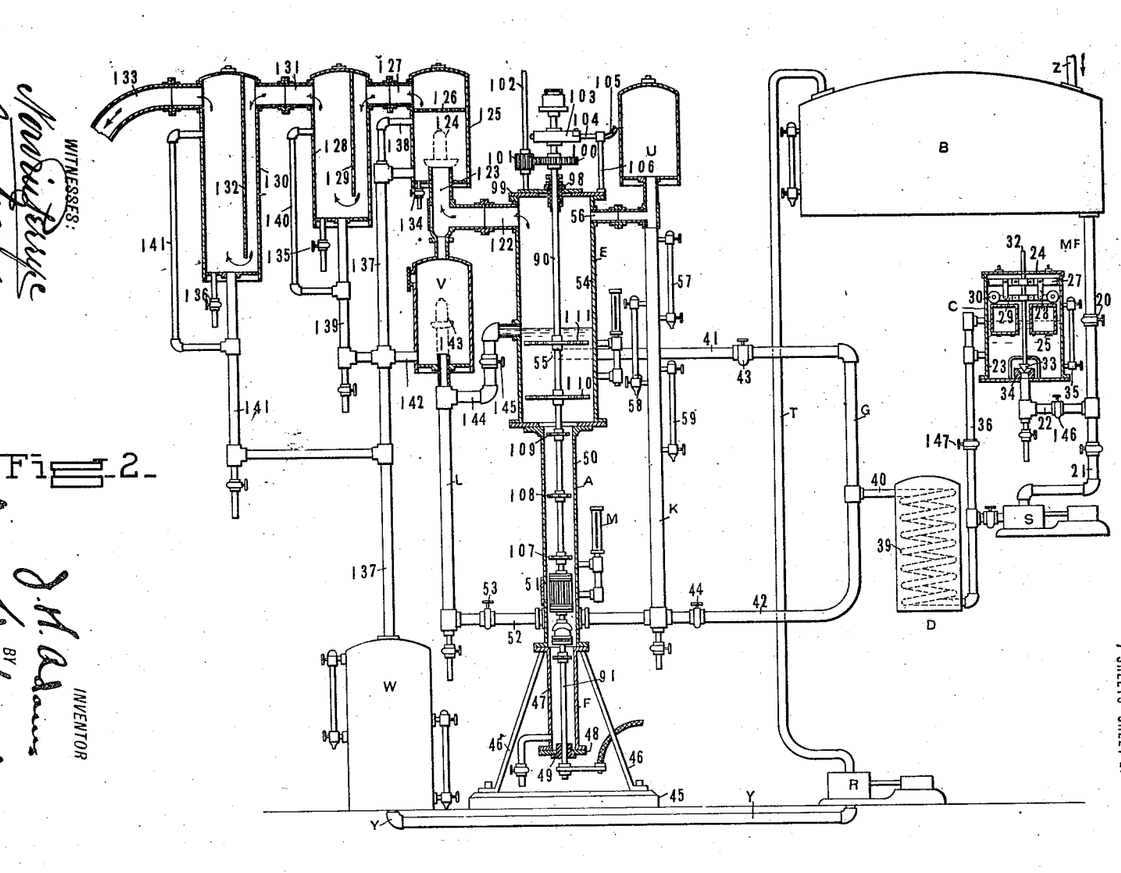
Fig. 2 is a more complete representation of a system composed of coöperating elements including a moving heater and having the capacity of continuously subjecting oils to my converting process and providing for an efficient retreatment of unconverted fractions of such oils.

*The reservoir tank.*—This is indicated on the drawings by the character B, and is, of course, to be taken in a purely conventional sense. This reservoir is filled with fresh supplies of the oil to be treated by means of a pipe Z, and also with unconverted fractions by a suitable return pipe T, and the oil is drawn therefrom by means of the main feed pipe MF, having a suitable valve 20. This main feed pipe may have a branch 21 (as shown in Fig. 2) communicating with the cold oil pump S, and is also in communication with an automatic float feed device C by means of branch line pipe 22.

*The automatic float feed C.*—The purpose of this device is to eliminate so far as possible the necessity of alertness and personal skill on the part of the operator in insuring that the oil to be treated shall be brought within the radius of action of the electric heater in proper quantities and without unduly varying the level of the oil above said electric heater. It may here be stated that in operating an apparatus of this character the action of the electric heater is often so violent and produces such disturbances in the rate of flow and positions occupied by the oil as to necessitate close vigilance on the part of the operator, but by means of the automatic float feed it is proposed to do away with the necessity of quickly closing or opening this or that valve to maintain the oil at the desired level.

The form of automatic float feed shown by the drawings will suffice to render the essentials thereof comprehensible to others. Such device comprises a closed receptacle 23, preferably provided with a removable cover 24 to enable the working parts to be inspected. Within this circular closed tank is an annular hollow float 25 providing a central well 26. From an upper stationary cross-bar 27 (in which a valve stem is slidably journaled) there depends one or more brackets 28 to the lower ends of which are pivoted levers 29 having weights 30 at their outer ends. The other ends of said levers 29 are pivoted to a collar 31, which is fixed to the valve stem 32, so that when the pivoted ends of said levers 29 rise through the fall of their outer weighted ends, the valve stem 32 will be lifted. The weights 30 may be in the form of rollers rotatively carried by the outer ends of levers 29 and normally supported by the annular float 25, so that as this float rises with the inflow of oil the weights will be lifted, resulting in a depression of the valve stem 32. At its lower end, such valve stem carries a suitable valve, such as the puppet 33, which co-acts with a valve seat 34, which in turn, is in communication with the inflow pipe MF. A gage glass 35 may be provided to give visual information as to the height of the oil in the automatic sight feed.

Preferably, a pipe 36 providing two branches 37 and 38 is used to withdraw the oil from the tank 23, the branch 37 being located uppermost and entering such tank 23 at a point coplanar with the predetermined level of the oil. The lower pipe 38 takes into the tank 23 below the level of the oil.

*The oil preheater D.*—Inasmuch as it is desired to conserve heat energy as much as possible in this apparatus, the comparatively cold oil flowing through the pipe 36 is preferably caused to pass through the oil preheater D and thus be raised in temperature before passing into the oil converting receptacle. This preheater may be of any suitable type but preferably provides a continuously rising coil 39 connected with the outlet pipe 40 which is located at the top so that any air bubbles may readily escape and not form air-locks in such preheating coil. The source of heat for said preheater may be the oil returning from the condensers and hot oil receivers at the other end of the apparatus or it may consist of any other heat supplying means.

*The oil converting receptacle.*—This composes that portion of the system in which the process of conversion is carried out and in this instance embodies an electric heater contained within a suitable receptacle and otherwise related to various operating and controlling adjuncts. The electric heater itself will be subsequently described. The receptacle shown by Fig. 2 provides a retort and converting chamber A, an underlying chamber F for receiving the heavy bottoms, and an overlying vapor dome E. The means for admitting oil to the conversion receptacle is shown as a piping G having an upper inlet or branch line 41 taking into the vapor dome E, and a lower inlet or branch line 42 taking into or below the retort A. The outlet pipe 40 from the preheater communicates with the piping G and by means of valves 43 and 44 the oil may be caused to flow directly into the upper dome E or into a lower part of the receptacle, as may be desired. The conversion receptacle may be supported from a suitable base 45 by means of supports 46 and will preferably consist of a number of sections bolted together in fluid tight connections. Thus the heavy bottom chamber F is formed of a pipe-like section 47 having a bottom plate 48 providing an insulating bushing 49 tightly fitted in a central aperture. This bushing in turn tightly encircles a vertical conductor and insulates the same from the metal of the receptacle. The overlying retort chamber may also consist of a pipe-like section 50 having a sight 51 in its side opposite the electric heater so that the action of the latter may be observed. A suitable thermometer M may be arranged in permanent relation with the chamber A so that the temperature of the oil therein may be kept under constant observation. As has been stated, the branch line feed pipe 42 may enter the retort, as shown, and also a branch line pipe 52 having a valve 53 may connect such retort with a return pipe L to enable a flow to take place as will be subsequently described.

The vapor dome E comprises a pipe-like section 54 having an inlet at 55 for the oil from the branch line pipe 41 and preferably also providing a connection 56 for the gage column pipe K. This pipe K connects at its lower end with the retort chamber A through the branch line 42 and is also permanently connected with the vapor dome through the pipe 56. This gage column provides the sight gages 57, 58 and 59, which show the level of the oil in the vapor dome. It has been found from experience that by using a gage column K having the sight gage glasses connected directly with the same, instead of with the conversion receptacle, that more positive and uniform readings are obtainable. Under the intense action of the heater, the oil in the conversion receptacle is at times greatly agitated, thereby producing a corresponding disturbance in the gage glasses, which, under such circumstances, tends to give misleading readings. The action of the gage column K is materially improved by providing the upper end thereof with vapor expansion chamber U. The said oil converting receptacle contains the heater which is preferably electrically operated so as to enable high temperatures to be positively maintained in members directly contacting with the oil and oily vapors to be treated.

*The electric heater.*—This invention proposes to intimately subject the oil to temperatures which, in comparison with any heretofore commercially used, are exceedingly high, and since this treatment, because of the volatile and inflammable character of the oil, presents many practical difficulties, the precise nature of the electric heater will now be described in detail, thereby imparting to those skilled in the art such a full understanding of this embodiment as will enable them to diversely formulate this invention to meet special conditions.

Any metal such as copper or its alloys having high electrical conductivities and capable of withstanding the action of a contact with oil while at moderately high temperatures, may be used for the construction of the supporting and current-conveying parts, but extensive experimentation has shown that comparatively few commercially available materials are wholly suitable for composing the resistance or heating members. Of such materials, the substance known as "graphitic carbon" is preferred. This easily obtainable substance is an artificial form of carbon made by an electrical process and is used to a considerable extent as a substitute for ordinary carbon or graphite in electric furnace work. This graphitic carbon is very homogeneous and non-amorphous in structure and somewhat resembles ordinary graphite, but is somewhat softer, less lustrous, and much better able to withstand excessive temperatures without cracking or otherwise disintegrating.

The electric heater will comprise a member composed of this or other suitable available material and such member or members may assume the form of a rod or rods such as that indicated by 10 of Figs. 6–9. Preferably, the electric heater comprises a circumferential series of such resistance rods or pencils, fastened together in pinion-like fashion to form a grid, and so connected that current may flow through the same at the best advantage. While the precise manner of connecting to these resistance rods may, of course, be varied to conform to the various available currents and to meet other conditions, the specific form shown by Figs. 6 to 9 inclusive will be found very suitable in most instances. This electric heater is adapted for working under an electric current having a relatively low voltage and an accordingly high amperage, which current is brought in by means of a metallic conducting rod 90. The end of such conductor 90 may be provided with screw threads 2 at its extremity preferably threaded into an internally threaded collar 3. A link 4 of massive proportions has an aperture 5 which circumscribes the end of the conductor 90, as shown, and a nut 6, which, like the collar 3, is preferably composed of metal, operates to securely clamp the link 4 in place and at the same time establish its electrical connections with the conductor 90. This link 4 is preferably composed of graphitic carbon and is sufficiently massive to convey current without its becoming unduly heated by such current. The object of utilizing this link in this way is to provide some means for connecting the conductor 90, which is unable to withstand excessive temperatures, with the resistance rod, which is intended to be normally maintained at such high temperatures. This link 4 serves admirably in this capacity and at its outer end it provides an aperture 7 through which passes the end of one of the resistance rods. The resistance rod 10 is sufficiently small in cross-section to be raised to a very high temperature by the current passing through the apparatus, and is provided with screw threads near its end. A nut 9 is in screw-threaded relation with the rod 10 and bears against the lower face of the link 4 while the nut 8 has a similar construction with respect to the rod 10 and clamps down against the upper surface of the link 4. By screwing these rods together fairly tightly, the several parts will not only be sufficiently positioned, but will also be efficiently connected electrically with the conductor 90. It may here be stated that link 4, the nuts 8 and 9, and the rod 10 are all preferably composed of the above mentioned graphitic carbon, which it has been found can be readily machined and which possesses sufficient strength to provide an amply strong structure. At its lower end, rod 10 is electrically connected by means of nuts 11 and 12 with the link 13, which extends circumferentially for a short distance and is connected in a counterpart manner by nuts 14 and 15 to the rod 16. At its other end, said rod 16 is similarly connected with rod 17, and in like manner the rods 17, 18, 19, 20 and 21 have their adjacent ends electrically connected in the manner described. The last mentioned rod 21 is connected with a conductor of opposite polarity 23'. In order to insulate and also separate 90 and 23' against relative movement without imposing unnecessary strain on the somewhat fragile resistance grid or heater, this invention also proposes a comparatively massive column 24' of non-conduction heat-enduring material such as soap-stone or the like. This intervening column may be screwthreaded or otherwise attached to conductors 90 and 23'.

Figure 10:
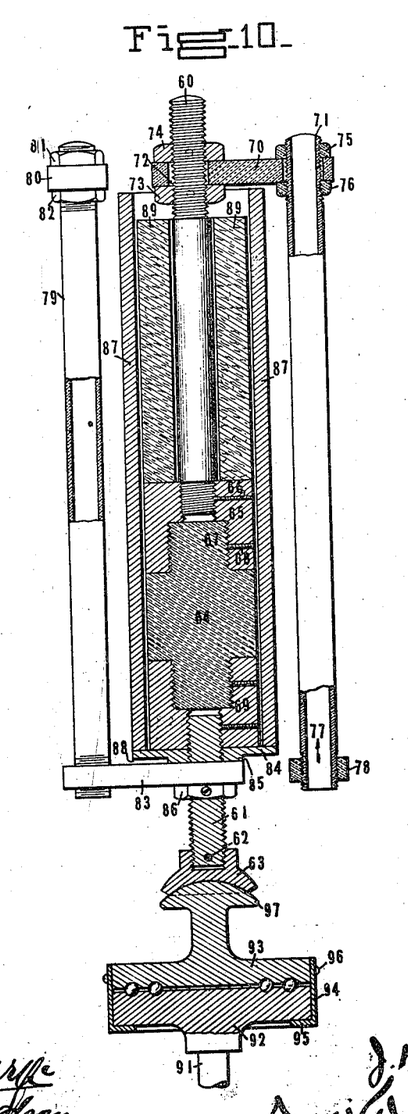
Fig. 10 is an elevation, partly in section, showing in detail an improved construction of the electric core or heater in which tubular electrodes are used.

*The movable electric heater.*—This heater is shown by Fig. 10 and merely constitutes a modified form of the stationary heater above described. The features of construction, wherein this modified heater differs from the stationary form enable a due amount of heating material to be brought into intimate contact with greater amounts of the oil to be converted. This is done by causing the electrodes to have a comparatively rapid movement while submerged in the oil and is also accomplished by giving one or more electrodes a tubular form and causing oil to pass through the bore of such tubular electrodes. This modified construction is embodied in the system set forth in Fig. 2, but the specific construction of the electric heater will be described in connection with Fig. 10 which shows the same in greater detail. The one terminal of this electric heater is designated by the character 60 and consists of a rod of copper or other material having a high electric conductivity, which rod is provided with screw threads at its upper and lower ends, as shown. The other terminal consists of a rod of similar material 61, screwthreaded throughout its length, and preferably having affixed to its lower end by means of the screw threads and a set screw or pin 62 a detachable section 63 of a ball and socket joint. Inasmuch as it is desirable that the two terminals 60 and 61 shall be insulated from one another, (except through the electrodes), and shall be held together in a rigid relation enabling them to move as a unit, this invention proposes an intervening section 64 composed of soapstone or other heat-enduring, insulating material and attached at opposite ends to the two terminals 60 and 61. A convenient expedient for fastening these members together consists in a collar 65 having a screwthreaded aperture adapted to receive the lower screwthreaded end of the terminal 60 and locked against rotation by means of a set screw 66, and also having an enlarged screwthreaded aperture adapted to receive a threaded end 67 of the soapstone interponent 64, and also located in place by means of a set screw 68 at the other end. A counterpart collar 69 may couple the interponent 64 and the terminal 61. At the upper screwthreaded end of the terminal 60, a link 70, preferably of graphitic carbon, electrically connects such terminal 60 with the first electrode 71 of the series. It being desirable that the link 70 shall be adjustable as to position for reasons hereinafter appearing, it may have an aperture 72, enabling it to freely pass over the threaded upper nut of the terminal 60, and securely fastened thereto in any desired vertical position by means of the lock nuts 73 and 74. At its other extremity, the link 70 has a corresponding connection with the electrode 71, being affixed thereto in the desired relation by means of the nuts 75 and 76 which are preferably composed of infusible material such as graphitic carbon. It will be noticed that the electrode 71 is tubular, thus enabling the oil to be converted to uprise through the same as shown by the arrow 77, and in this way increase the converting capacity of the electrode 71 by enabling oil to contact therewith internally as well as externally. At its lower end, this electrode 71 is connected with a link 78, and, for the sake of simplicity, this may be done by directly screwthreading the lower end of the electrode 71 into a screwthreaded aperture of the link 78. It is preferable, however, to use the nuts at the other end of the electrode so that any inequalities in length may be easily compensated for by means of the lock nuts and thus prevent undue strains caused by any slight inaccuracies in the proportions of the parts. The successive electrodes will be connected together in a corresponding manner, using lock nuts at the one end and direct thread connections at the other end. 79 illustrates the last electrode of the series which receives the current from its preceding companion by means of the link 80 positioned by the lock nuts 81 and 82 and is connected with the other terminal 61 by means of the link 83 with which it is preferably directly connected as described. The terminal 61 carries a supporting collar 84, which, being screwthreaded thereto, will not undergo displacement relatively to the terminal 61. The link 83 presses against a hub-like portion 85 of the supporting collar 84 and is held in place by means of a nut 86 screwthreaded to the terminal 61. This structure possesses the advantage that in case the link 83 should become fractured, it may be easily replaced by removing the section 63, and then unscrewing the nut 86.

In order to protect the terminals 60 and 61 from the intense heat of the incandescent electrodes and at the same time to restrict the flow of oil to the immediate vicinity of the electrodes, this invention proposes a heat-insulating shell 87 which may assume the form of a porcelain tube. This tube 87 rests directly on the supporting collar 84 and is thus supported in such a way that its weight is not carried by the electrodes. Because of the fact that the circumferential portions of the collar 84 are slightly distanced as indicated by 88 from the link 83, such link 83 is protected from bending strains which might otherwise occur and cause fractures thereof. The length of the porcelain 87 is such as to fall slightly short of the upper links 70, 80, etc., and its internal diameter is preferably only slightly larger than that of the soapstone interponent 64 and the collars 65 and 69. The remaining space is taken up by the tubular member 89 which is a bore of such size as enables it to be readily slipped over the terminal 60, as shown by Fig. 10. This tubular member 89 will preferably be composed of some suitable asbestos-containing, heat-insulating material, having the capacity of enduring considerable temperatures.

Inasmuch as it is desired to rotate the electric heater shown by Fig. 10 through the vertical conductor 90, which is, in turn, driven by means hereinafter to be described, this invention also proposes to support the lower end of the electric heater on one or more rotatable bearings capable of carrying the heavy currents which are necessary to maintain such heater at its high temperature. A simple and satisfactory form of such bearing may be formed by non-rotatably supporting the conductor 91, in the bottom plate 48 of the section F of the oil-converting receptacle, by means of a suitable oil-tight bushing 49. The upper end of this conductor 91 terminates in the collar 92, forming a section of a ball bearing, as shown by Fig. 10. The complementary section 93 of this ball bearing, preferably carries an annular retainer 94, having an inturned flange 95 bearing against the collar 92 and is detachably secured to the upper section 93 by means of screws 96. The upper section 93 carries a portion 97 having a spherical upper surface closely interfitting with the spherically concaved seat provided by the lower surface section 63. This construction enables the electric heater to be easily removed as a unit by uplifting the same by means of the conductor 90, since the sections 63 and 97 may easily be separated and, because of their interfitting construction, they may be readily brought together by simply lowering the electric heater until the section 63 contacts with the section 97 and automatically assumes a close fit therewith, as will be readily understood. The conductor 90 is journaled in a gas-tight bushing 98 carried by the removable top plate 99 of the vapor dome E. The object of making this plate 99 removable is to enable the parts to be withdrawn whenever an undue quantity of carbon has been deposited on the electrodes, or whenever for other reasons it is desirable to replace or clean parts thereof. The conductor 90, which has a driving, screwthreaded connection with the upper end of the terminal 60, is, in turn, driven through the gear 100, which gear is impelled by a driving pinion 101, mounted on the driving shaft 102. One or the other of these gears, or both, may be constructed of fiber or other insulating material or may be insulated by means of fiber bushings. The conductor 90 is electrically connected with the generator by means of a commutator and bushing 103 and 104 to which the current is led by means of a conductor 105, carried by a support 106, so as to be insulated from the receptacle E. To prevent an undue agitation of the oil within the receptacle, during the process of conversion, and to insure a steady and uniform flow of such oil, a series of apertured baffle plates 107, 108, 109 and 111 may be mounted on the conductor 90.

Figure 1:
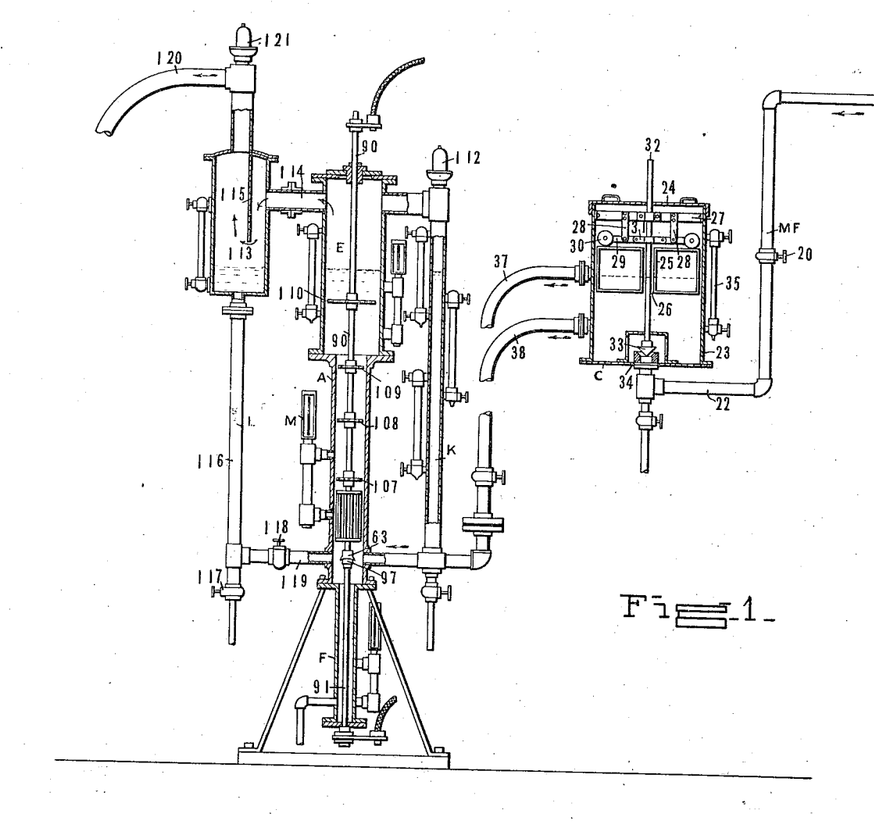
Figure 1 is a partly sectional illustration of an apparatus embodying certain aspects of this invention in which non-rotatable electrodes are employed, and also showing the structural details of an automatic feed typical of an element of this system.
Figure 11:
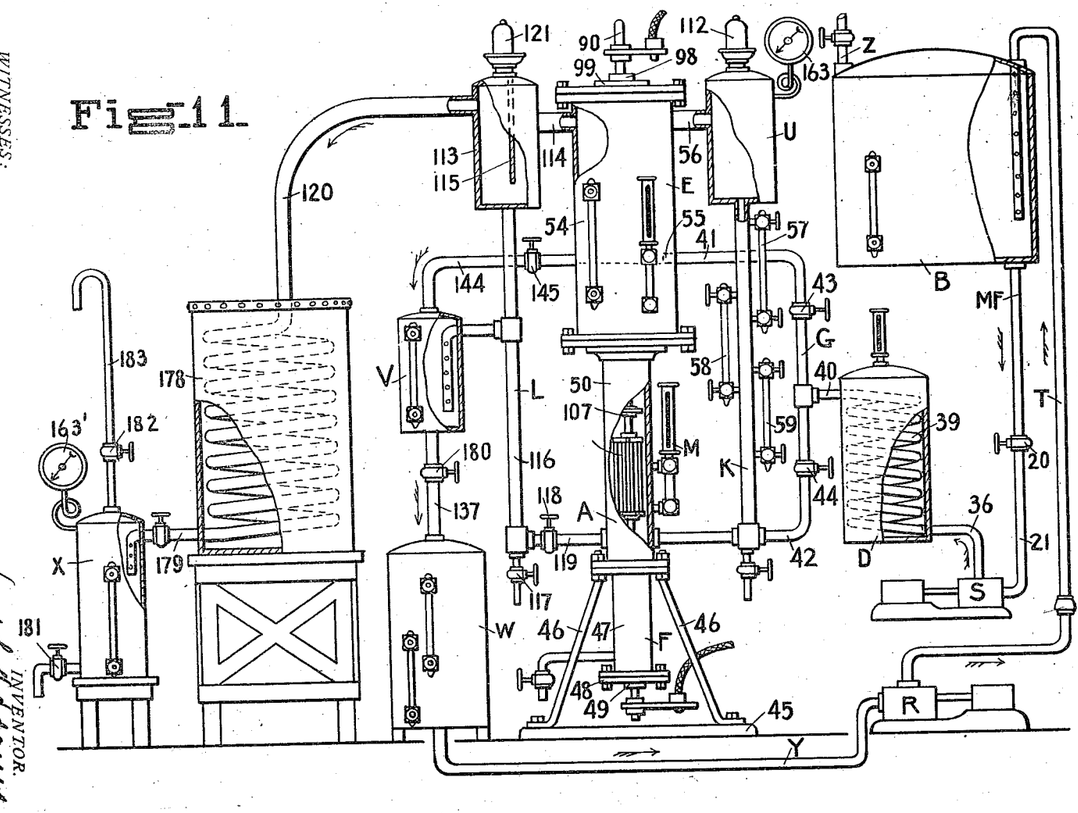
Fig. 11, is an elevation view of the assembled construction of a complete unit apparatus showing, in combination, the principal necessary correlated parts from the oil supply to distillate collecting tanks at opposite ends of the system.

Many of the features of construction set forth in the foregoing may be used without others, thus, as shown in Fig. 1, the device may assume a modified form in which the electric heater is stationary instead of being rotatable. In this case the ball bearing may be dispensed with though preferably the self-seating sections 63 and 97 will be used to enable the heater to be readily withdrawn and replaced without any difficulty and at the same time insuring good electrical connections. The conductor 90 shown by Fig. 1 may also provide perforated baffle plates 107, 108, 109 and 110, as shown. In the simple arrangements shown by Fig. 1, gage column pipe K may provide a pop valve 112 at its upper end, in lieu of the expansion chamber U shown in connection with Fig. 2 or as shown in Fig. 11, the release pop valve 112, may be mounted at the top of tank U.

*Apparatus for collecting and returning heavy unconverted oils.*—It may here be stated that since the process of conversion depends upon subjecting oil or oily vapors to very high temperatures considerably above their vaporizing points, and since this evidently cannot be done without volatilizing in unconverted form large quantities of such oil, it will be necessary to retreat such fractions as have escaped the action of the process. By arranging the electrodes in the manner described, it is possible to materially reduce the escape of unconverted oils, but nevertheless, it has been found that considerable quantities pass through the converting receptacle without having been materially affected. Such oils, being comparatively heavy, may be readily condensed or caught by properly arranged baffle plates, and to this end this invention proposes a structure or system of parts intervening between the condenser for the converted fractions and the oil-converting receptacle. Turning now to Figs. 1 and 11 wherein is shown a simple construction of this character, 113 denotes a hot oil tank connected with the vapor dome E of the converting receptacle by means of pipe 114. The oily vapors and particles of heavy oil carried thereby, pass through this pipe 114 and project against the baffle plate 115 and this action results in the precipitation of considerable quantities of the heavy oil. This oil collects in the tank 113 and may be withdrawn from the same by opening the cock 117 in the pipe 116 or may be returned directly to the action of the electric heater by opening the cock 118 in the return pipe 119. Such vapors as have escaped condensation in the tank 113 pass through the pipe 120 to a suitable condenser capable of condensing all products which may have a liquid form at ordinary temperatures. A pop valve 121 is preferably provided in this form of the apparatus to insure safety in case the pressure should become excessive.

Returning now to Fig. 2, there will be seen a comparatively more efficient form of this apparatus capable of handling the oil to a better advantage on a commercial basis.

The oil vapors super-saturated with more or less of the unconverted comparatively heavy oils and also carrying minute particles of the same, pass out of the vapor dome through the pipe 122, and thence up through the short riser 123 and by the pop valve 124 into the expansion and condensing dome 125. While expanding, considerable quantities of the heavy untreated fractions will be precipitated and caught by the perforated baffle plate 126 and returned to the bottom of the expansion tank 125. The vapors, which may still be charged with quantities of unconverted oil, then pass through pipe 127 into the vapor trap 128, wherein a still further precipitation may obtain through the contact of such vapors with the perpendicular baffle plate 129. The vessel 128 is preferably slightly larger than tank 125 and may in turn be connected with a counterpart but still larger vessel 130 by means of the pipe 131. The major portion of the remaining unconverted fractions of the oil will be precipitated by the baffle plate 132 so that the oil which finally passes out through the pipe 133 will display a gravity materially higher on the Baumé scale than the portions originally admitted to the action of the electric heater. The pipe 133 leads to a suitable condenser which may assume any of the forms commercially available.

Each of the tanks 125, 128 and 130 is preferably provided with drain pipes controlled by valves 134, 135 and 136, so that samples of the oil collected in such tanks may be directly obtained. A system of piping is also employed to return the accumulated heavy oils to the main reservoir tank containing the fresh supplies of oils to be treated. Thus, a pipe 137 connects directly with the lower portion of the tank 125 and preferably also provides an emergency branch line 138 connecting with the upper portion of said tank. This pipe leads directly to a receiving tank W, which is, in turn, connected with a hot oil pump R by means of a return pipe Y, and the pump R is connected with a reservoir tank B by means of a pipe T either directly, as shown, or indirectly through the pre-heater D, so that the heat in the returned oil may be utilized in raising the temperature of the pre-heater. In like manner a pipe 139 connects the bottom of the tank 128 with the tank W and provides an emergency branch line 140 and a pipe 141 connects the lower part of the tank 130 with the tank W and may also provide a similar emergency branch line 141.

The oil carried over through the pipe 122, and precipitated during its flow through the short riser 123, flows back into the hot oil tank V and thence into the return pipe 137 through the outlet 142. This tank V contains a puppet 143, which is mounted at the upper extremity of the pipe L, which pipe is connected at its upper end with the vapor dome E at the level of the oil therein, through the branch line 144 and at its lower end with a retort A through the branch 52. Valves 53 and 145 enable the flow of oil through these pipes to be controlled.

*Mode of operation.*—This apparatus may be operated by gravity with the oil flowing either upwardly or downwardly past the electrodes, or it may be operated under high pressure with a corresponding alternativeness in the flow of the oil. Thus, when operating by gravity, with a down flow of the oil, certain valves are open and others closed, as will be understood, so that the oil therein from the reservoir tank B passes down the main feed pipe MF through the automatic feed regulator thence through the pre-heater D and into the pipe G. Valve 44 being closed and valve 43 being open, the oil will flow through the branch 41 and into the receptacle E at point 55. Valve 145 being closed, such oil will flow down past the electric heater out through the pipe 52, up through the pipe L, into the tank V and thence into the receiving tank W. The vapors will pass through the parts described in the foregoing paragraphs.

In case it is desired to have the flow upwardly past the electrodes, the valve 43 will be closed and 44 opened, thus admitting the oil to the lower section A and forcing it upwardly into the vapor dome E, the valves 53 being closed. The vapors, &c., will rise through the pipe 122 and the liquid oil flow out through pipe 144, the valve 145 being open, and into the tank V and then into the receptacle W, from which it may be returned to the main reservoir B by means of the pump R. In case it is desired to act upon the oil under heavy pressure, valves 146 and 147 will be closed to cut out the automatic float feed (Fig. 2) and the pump S will be put into operation to draw oil from the reservoir B and force the same under heavy pressure through the pre-heater D. Dependent upon the adjustment of the valves 43 and 44, the oil may be caused to flow either upwardly or downwardly past the electric heater 51. In this connection it is to be noted that the pop valves 124 and 143 not only control the pressures but also act as safety valves, for whenever the pressures become excessive one or the other or both of these valves will open and permit the vapor and the fluid oil to escape into the return parts of the system. Valve 143 is so positioned and tensioned as to maintain the level in the receptacle E in the position desired.

It will be clear that the oil supplied from the oil reservoir may have a substantially fixed rate of flow to and past the heater. This substantially constant relative movement of the oil and heater may be changed by the rate of converson of the heater for if the rate of conversion becomes greater the rate of flow will correspondingly increase. This acceleration in the rate of flow of oil is adapted to be controlled by the automatic regulator which is intended to keep a practically constant depth of oil in the converting chamber. Again, it will be obvious that the relative movement between the electric heater and the oil may be also accelerated by the rotation of the electric heater.

Figure 5:
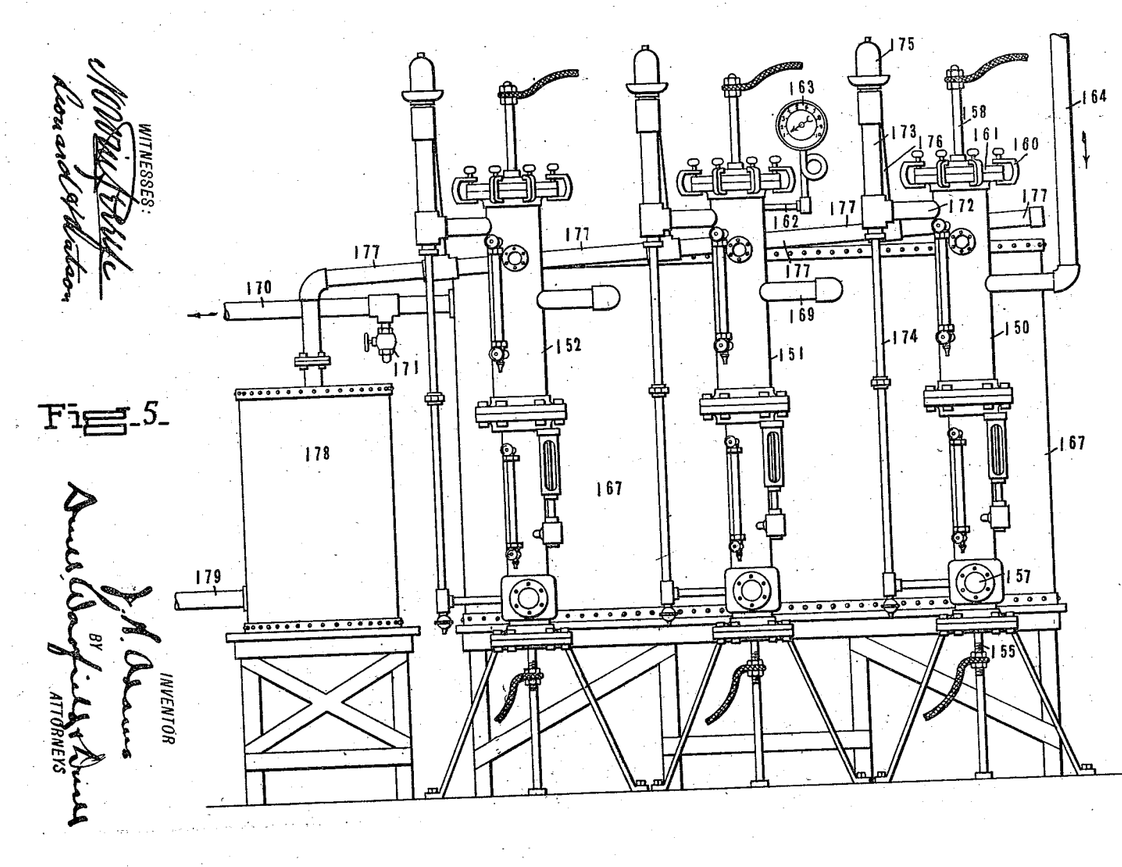
Fig. 5 illustrates a series of converters adapted to subject oil to the successive action of my high-temperature heaters.
Figure 6:
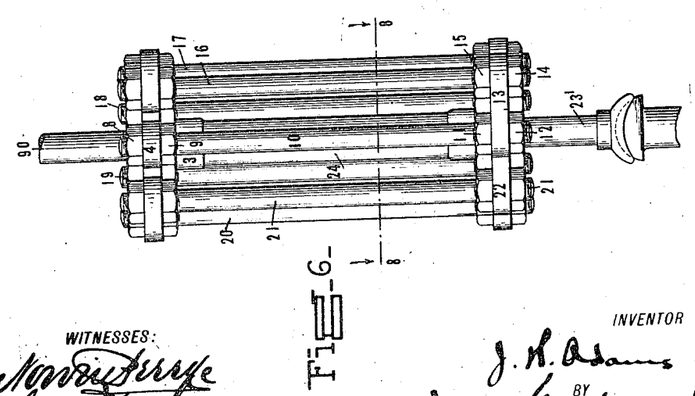
Fig. 6 is an elevation of a preferred form of heater.
Figure 7:
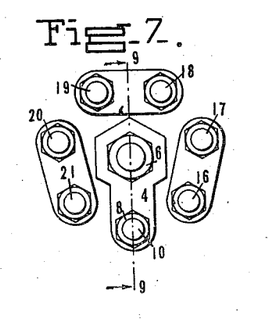
Fig. 7 is a top or plan view of the device shown by Fig. 6.
Figure 8:
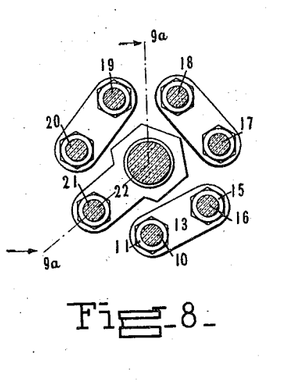
Fig. 8 is a section looking downward along line 8—8 of Fig. 6 showing certain details more clearly.
Figure 9:
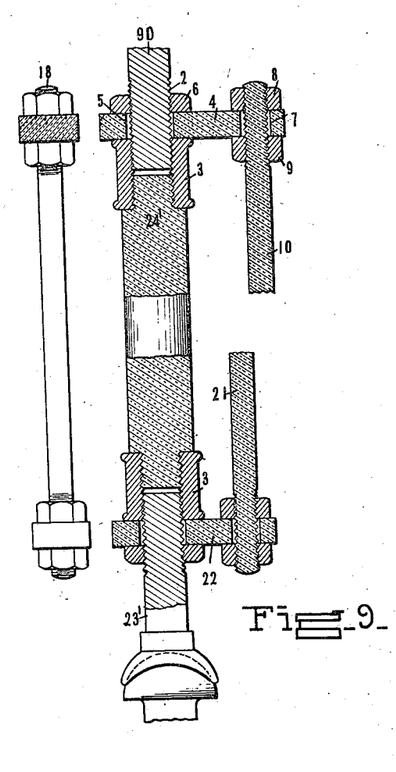
Fig. 9 is an enlarged section taken at its upper end along line 9—9 of Fig. 7 and at its lower end along line 9ª—9ª of Fig. 8, so as to render more apparent the structural details of this device.

In the forms illustrated in Figs. 1, 5 and 11 where the condenser is shown in free communication with the converter the pressure in the converter will of course extend throughout the condenser and therefore in order to maintain the pressure it is necessary to have some closure for the system beyond the condenser. Such a closure will be understood by those skilled in the art as existing in the pipe 179 beyond the point where that pipe is broken away, in Fig. 5, and such closure is illustrated in Fig. 11 as consisting of a valve 181 in the liquid discharge outlet and a valve 182 in the gas pipe leading from tank X. It will further be understood by those skilled in the art that the generation of vapors in the converter will cause pressure and consequently make it necessary to use a pump or other means for forcibly feeding the oil into the system continuously.

Figures 3, 4:
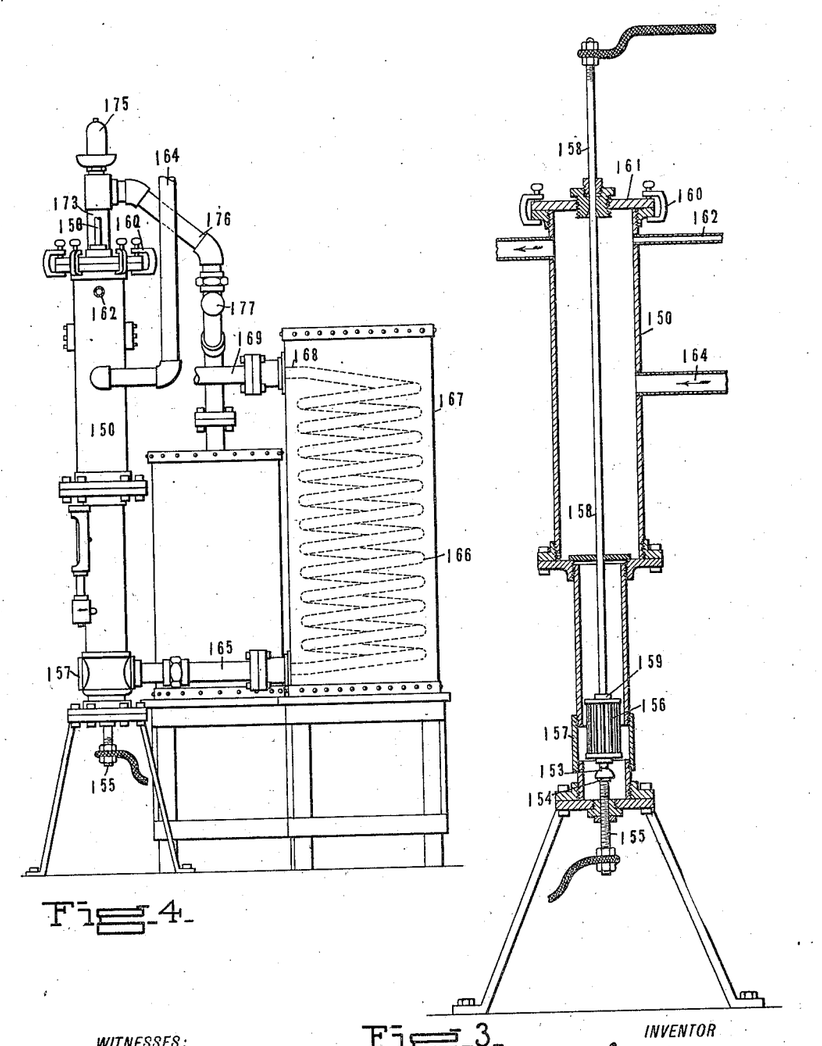
Fig. 3 shows a simple form of converter which may be used as an element of my apparatus.
Fig. 4 illustrates said converter connected with other parts.

Figs. 3, 4 and 5 illustrate another form of this invention suitable for the treatment of various grades of oil by causing the oil to first pass through a preliminary converter, then through a suitable cooling coil and thereafter through one or more retreating converters and cooling coils. Thus, as shown, the oil may successively course through a series of three converters 150, 151 and 152 freely connected one with another by means of vapor line 177, and thus successively undergo an alteration in character until the final desired quality is imparted to said oil. Fig. 3 represents in cross section the construction of a very simple form of converter such as those in Figs. 4 and 5. This form is to be regarded as typical in these figures as any of the above disclosed more important forms may be employed. In this form the electric heater has its lower terminal 153 detachably connected with the lower leading-in conductor 155 by means of a self-seating joint 154 such as that described in connection with the other forms. The electric heater 156 is positioned opposite sight-glass 157 in the lowermost narrow portion of the converting receptacle and the conductor 158 leads upwardly from the terminal 159 as described in the foregoing description. This conductor 158 is detachably secured to the upper terminal 159 of the electric heater but the connection is such that the heater may be raised out of the receptacle by withdrawing the conductor after removing the clamps 160 which hold down the cover-plate 161 of the upper end of the converting receptacle. One or more of these receptacles may be provided with a pipe 162 leading to a pressure gage 163 so as to enable the operators to be constantly informed as to the pressure under which the apparatus is working.

In operation, the oil to be treated enters through the pipe 164, then flows into the vapor dome, thence downwardly into the retort past and into intimate contact with the incandescent electrodes of the heater, and thence out through pipe 165 (see Fig. 4), into the lower end of the coil 166 of the cooler 167. By entering at the lower end of this coil, the oil and gases are able to rise therethrough without interruption and without the likelihood of forming air-pockets. The upper end 168 of the coil 166 is connected with a pipe 169 leading into the next converter 151 of the series. The oil then passes down through the incandescent converter past the incandescent electrodes thereof, into a second cooling coil, then into a third retort, etc. Ultimately, the oil passing through the series emerges from the last cooling coil through a pipe 170 preferably provided with one or more draw-off cocks 171 and from this it may be returned to the beginning of the series if desired.

Returning now to the first converter, the course of the vaporized products may be followed. The major proportion of the vapors evolved in the first converter 150 will rise through the vapor dome and out through the pipe 172 at the upper end of such dome. The vapors must then rise a short distance through the stand-pipe 173 and the precipitated uncon rted residues may flow back through the pipe 174 and return to the action of the electric heater. The vapors that rise through the stand-pipe 173 pass by the release pop valve 175, which will be operative in case the vapor pressure unduly increases, and then will flow downwardly through the elbow pipe 17 into the inclined vapor main 177. The successive converters are connected in like manner and discharge their converted product into the inclined main 177 which leads to the condensing apparatus 178 and from which the converted product may be withdrawn through the pipe 179.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention what I claim as new and desire to secure by Letters Patent is:—

1. An apparatus of the nature disclosed, comprising in combination, an oil tank, a receptacle connected therewith, an electric heater arranged in said receptacle, means for enabling oil to be maintained in said receptacle at approximately a predetermined level above said electric heater, and a pressure pump for accelerating the relative movement between the electric heater and the oil contacting therewith when said heater is at an elevated temperature.

2. An apparatus of the nature disclosed, comprising in combination, an oil supply tank, a vertically elongated retort, an electric heater arranged in the lower part of said retort, piping intervening between said retort and said tank, an automatic oil feed device interposed in said piping to automatically open communication between said tank and retort when the level of oil in the latter lies below a predetermined level, and to automatically close said communication when said level is attained.

3. An apparatus of the nature disclosed, comprising in combination, an oil supply tank, a receptacle connected therewith, an electric heater arranged in said receptacle comprising a multiple of graphitic-carbon rods alternately and serially connected at their ends, a condenser in free communication with said receptacle and a liquid collecting tank at the foot of or beyond said condenser connected therewith; means for enabling oil to be maintained in said receptacle at a predetermined level above said heater and means for continually supplying oil to said receptacle to compensate for that withdrawn therefrom in liquid or vapor form.

4. An apparatus of the nature disclosed, comprising in combination, an oil tank, a receptacle connected therewith, an electric heater arranged in said receptacle, comprising a plurality of serially connected graphitic-carbon rods, means for enabling oil to be maintained in said receptacle at approximately a predetermined level above said heater when at an elevated temperature and means for supplying electric current to said heater for the purpose of raising the temperature of said oil to heat of sufficient intensity to crack and convert the same into oils essentially different from the original untreated oils.

5. An apparatus of the nature disclosed, comprising in combination, an oil tank, a receptacle connected therewith, an electric heater comprising a circumferentially arranged series of graphitic-carbon rods, terminals supported by said receptacle and electrically connected with said heater and serving to maintain the same at a fixed level with respect to said receptacle, a pressure pump and valves for regulating the entry of oil to said receptacle whereby its level may be maintained at approximately a predetermined distance above said heater and means for maintaining vapor pressures in excess of atmospheric pressure within said receptacle to assist in the process of oil conversion.

6. An apparatus of the nature disclosed, comprising in combination, an oil tank, a receptacle connected therewith, an electric heater within said receptacle comprising a series of resistance rods, a plurality of links alternately connecting the adjacent ends of said resistance rods in series, electrical connections extending from the exterior of said receptacle to the terminals of said electric heater to enable a heavy electric current to pass through said resistance rods in order to maintain the same at an elevated temperature while submerged in the oil contained in said receptacle, a pressure pump for accelerating the relative movement between said electric heater and the oil contacting therewith, means for raising the temperature of said oil above its vaporizing points and means for maintaining super-atmospheric vapor pressures within said receptacle.

7. An apparatus of the nature disclosed, comprising in combination, an oil supply tank, a receptacle connected therewith, an electric heater comprising a circumferentially arranged series of graphitic-carbon resistance tubes, terminals supported by said receptacle and electrically connected with said heater and serving to maintain the same at a fixed point within said receptacle; means for causing rotation of said tubular heater, a pressure pump and valves for regulating the entry of oil into said receptacle whereby its level may be maintained at approximately a predetermined distance above said heater, means for raising temperatures of oils above their boiling and vaporizing points and means for maintaining vapor pressures in excess of atmospheric pressure over the oil in said receptacle and in the condenser.

8. An apparatus of the nature disclosed, comprising in combination, a source of oil, a receptacle connected therewith containing a heater, a condenser in free communication with said receptacle, a pressure pump for forcing oil from said source into said receptacle while oil contained therein is maintained under vapor pressure, means for subjecting oil in said receptacle while under pressure above atmospheric pressure, to the action of a member maintained at a temperature sufficient to raise the heat of contained oil in said receptacle to heat in excess of their vaporizing points.

9. In an apparatus of the nature disclosed, comprising in combination, a source of oil, a heating member and an inclosed oil containing receptacle in free communication with a condenser; a pump for forcing oil from said source into intimate contact, while under pressure above atmospheric pressure, with said heater while the latter is at an intense temperature; means for withdrawing and condensing under pressure vapors evolved from said containing receptacle.

10. An apparatus of the nature disclosed, comprising in combination, an oil supply tank, a receptacle connected therewith, an electric heater arranged in said receptacle comprising a multiple of graphitic-carbon rods alternately and serially connected at their ends, a condenser in free communication with said receptacle and a liquid collecting tank at the foot of or beyond said condenser connected therewith; means for maintaining high pressure in said apparatus, means for enabling oil to be maintained in said receptacle at a predetermined level above said heater and means for continually supplying oil to said receptacle to compensate for that withdrawn therefrom in liquid or vapor form.

11. An apparatus of the nature disclosed, comprising in combination, an oil supply tank and pump, an oil pre-heater and series of two or more tubular converters freely connected by a vapor line one with another and in free communication with a condenser, heaters contained within the tubular converters, a heater for raising temperatures of the supplied oils and means for continuously circulating oil through the apparatus under pressure for the purpose of converting high boiling oils into lower boiling products under the influence of intense cracking heats and super-atmospheric pressures.

12. An apparatus of the nature disclosed, comprising in combination, an oil supply, heating means capable of being raised to incandescence, means for continuously feeding oil from said supply to said heating means, means for condensing and returning to the oil supply the unconverted high boiling point products and means for condensing the remaining vaporous products.

13. An apparatus of the nature disclosed, comprising an elongated retort of restricted cross section, means for continuously supplying oil under pressure to said retort, means for locally applying high heat to the restricted volume of oil in said retort to convert or crack the same, means for maintaining the generated vapors under pressure in contact with the surface of the oil in said retort and means for condensing the vapors.

14. An apparatus of the nature disclosed, comprising an elongated retort of restricted cross section, means for continuously supplying oil under pressure to said retort, means for locally applying high heat to the restricted volume of oil in said retort to convert or crack the same, means for maintaining the generated vapors under pressure in contact with the surface of the oil in said retort, means for collecting and returning to the source of supply portions of unconverted liquid carried by said vapors and means for condensing the remaining vapors.

15. An apparatus of the nature disclosed, comprising in combination, a closed chamber adapted to contain oil, means for heating the oil in said chamber to a cracking temperature, means for continuously forcing oil into said chamber under pressure, a condenser in free communication with said chamber and means for maintaining pressure in said apparatus to and through the condenser.

16. An apparatus of the nature disclosed, comprising in combination, a retort embodying a pipe-like section, means for locally heating the oil in said pipe-like section to a cracking temperature, means for continuously forcing oil into said section under pressure, a condenser in free communication with said chamber and means for maintaining pressure in said apparatus to and through the condenser.

17. An apparatus of the nature disclosed, comprising in combination, a source of oil, a receptacle connected therewith, and a heater combined with said receptacle adapted to be maintained at a cracking temperature in contact with the oil therein, an outlet for the oily vapors evolved by the action of said heater, a receptacle connected with said outlet and adapted to collect portions of the oily liquid carried by said vapors, means for returning said collected liquid to the action of said heater, and means for condensing the residual vapors.

18. An apparatus of the nature disclosed comprising in combination a plurality of oil converters, a condenser and means for maintaining pressure on the oil in said converters to and through said condenser.

19. An apparatus of the nature disclosed comprising in combination a plurality of oil converters adapted to furnish a vapor space above the oil therein, a condenser, means for connecting the vapor spaces of said converters with said condenser and with each other and means for maintaining pressure in said converters to and through said condenser.

20. An apparatus of the nature disclosed comprising in combination a series of oil converters, means for supplying oil under pressure to the first converter of the series, means for separating from the vapors generated the unconverted oil and for supplying that oil to the next converter of the series, means for taking off and condensing the converted vapors from said converters, and means for maintaining pressure on said vapors in the converters to and through the condensing means.

21. An apparatus of the nature described, comprising in combination, an oil supply tank, a vertically elongated retort, an electric heater arranged in the lower part of said retort, piping intervening between said retort and said tank, and an automatic oil feed device interposed in said piping to automatically open communication between said tank and retort when the level of the oil in the latter lies below a predetermined level, and to automatically close said communication when said level is attained.

22. An apparatus of the nature disclosed, comprising in combination, a source of oil, a receptacle connected therewith, a pressure pump for forcing oil from said source into said receptacle under pressure, and means for subjecting the oil in said receptacle while under pressure to the action of a member maintained at an incandescent temperature.

23. An apparatus of the nature disclosed, comprising in combination, a source of oil, a receptacle connected therewith, means for maintaining oil under pressure in said receptacle, and a heater adapted to be maintained at a cracking temperature while in contact with said oil under pressure.

24. An apparatus of the nature disclosed, comprising in combination, a source of oil, a receptacle connected therewith, and a heater combined with said receptacle adapted to be maintained at a cracking temperature in contact with the oil therein, an outlet for the oily vapors evolved by the action of said heater, a receptacle connected with said outlet and adapted to collect portions of the oily liquid carried by said vapors, means for returning said collected liquid to the action of said heater, and means for condensing the residual vapors.

25. An apparatus of the nature disclosed comprising in combination, an oil tank, a receptacle connected therewith, an electric heater within said receptacle comprising a series of carbon rods, a plurality of carbon links connecting the adjacent ends of said carbon rods, and electrical connections extending from the exterior of said receptacle to the terminals of said electric heater.

26. An apparatus of the nature disclosed comprising in combination, an oil tank, a receptacle connected therewith, an electric heater within said receptacle comprising a series of resistance rods, a plurality of relatively infusible links connecting the adjacent ends of said resistance rods, electrical connections extending from the exterior of said receptacle to the terminals of said electric heater to enable a heavy electric current to pass through said rods to maintain the same at an elevated temperature while submerged in the oil contained in said receptacle, means for maintaining said oil at approximately a pre-determined level within said receptacle, and a pump for accelerating the relative movement between said electric heater and the oil contacting therewith.

27. An apparatus of the nature disclosed comprising in combination an oil tank, a receptacle connected therewith, a plurality of carbon tubes alternately connected by links and arranged in said receptacle to enable oil to flow through the bores thereof, means for supporting said tubes comprising a heater located at a fixed point within said receptacle, means for maintaining oil within said receptacle to enable oil to constantly occupy and flow through the bores of said carbon tubes and means for heating said tubes.

28. An apparatus of the nature disclosed comprising in combination an oil tank, a receptacle connected therewith, an electric heater comprising a circumferentially arranged series of graphitic carbon tubes, terminals supported by said receptacle and electrically connected with said heater and serving to maintain the same at a fixed position within said receptacle, electric connections extending from the exterior of said receptacle to the terminals of said electric heater, means for regulating the entry of oil to said receptacle whereby its level may be maintained at approximately a predetermined distance above said heater and means for heating said tubes.

In testimony whereof I affix my signature, in the presence of two witnesses.

JOSEPH H. ADAMS.

Witnesses:
LEONARD A. WATSON,
H. M. SEAMANS.